United States Patent [19]

Viola et al.

[11] Patent Number: 4,737,970

[45] Date of Patent: Apr. 12, 1988

[54] CLOCK RECOVERY USING CAVITY RESONATOR

[75] Inventors: Jeffrey P. Viola, Brookhaven, Pa.; Roger C. Ubben, Cherry Hill, N.J.

[73] Assignee: RCA Corporation, Princeton, N.J.

[21] Appl. No.: 741,875

[22] Filed: Jun. 6, 1985

[51] Int. Cl.[4] .............................................. H04L 7/00
[52] U.S. Cl. ..................................... 375/106; 375/97; 455/608
[58] Field of Search ................... 375/94, 97, 106, 110; 331/1 A; 455/608, 328, 281, 290; 328/63, 72

[56] References Cited

U.S. PATENT DOCUMENTS

| 2,433,758 | 12/1947 | Hershberger | 331/96 |
|---|---|---|---|
| 3,209,261 | 9/1965 | Critchlow | 375/110 |
| 3,249,763 | 5/1966 | Hopner | 307/261 |
| 3,270,339 | 8/1966 | McEven et al. | 455/328 |
| 3,276,019 | 9/1966 | Fackler | 455/81 |
| 3,376,507 | 4/1968 | McEven et al. | 455/328 |
| 4,222,117 | 9/1980 | Bugg | 375/110 |
| 4,538,119 | 8/1985 | Ashida | 331/1 A |
| 4,543,961 | 10/1985 | Brown | 455/605 |
| 4,562,582 | 12/1985 | Tokura et al. | 375/87 |

FOREIGN PATENT DOCUMENTS 2114843 8/1983 United Kingdom .

OTHER PUBLICATIONS

U.S. patent application Ser. No. 463,165, entitled "Clock Regenerator", filed Feb. 2, 1983, by: M. Abdel-Megeid.

"Q" by K. L. Smith, published in Electronics and Wireless World Magazine, Jul. 1986.

Primary Examiner—Robert L. Griffin
Assistant Examiner—Stephen Chin
Attorney, Agent, or Firm—Clement A. Berard, Jr.; William H. Meise; Robert L. Troike

[57] ABSTRACT

A high data rate optical network data communication system includes a receiver including a photodiode detector, a data slicer and a data decision circuit. A clock recovery arrangement includes an impulse generator coupled to the data slicer to generate impulse signals. The impulse generator includes a high speed ECL NOR gate driven by mutually out-of-phase and relatively delayed data. The impulse signals are applied to ring a coaxial cavity by way of a resistor and an input magnetic coupling loop. The coupling loop allows the cavity to achieve high Q so it will oscillate for a relatively long time, and also provides a path by which bias is applied to the output of the NOR gate to fulfill ECL biasing requirements. The cavity Q is maintained high by coupling signals from the cavity by way of a second magnetic coupling loop. The oscillations are applied by way of a limiter to the data decision circuit.

11 Claims, 3 Drawing Sheets

CLOCK RECOVERY USING CAVITY RESONATOR

This invention relates to data communication systems and more particularly to clock recovery circuit for high data rate systems.

BACKGROUND OF THE INVENTION

Binary data systems transmit or store data in the form of one of two signal states. By comparison with analog signal transmission and storage systems, binary data systems can be extremely reliable, because noise inherent in signal processing ordinarily does not affect the signal. A binary signal has the disadvantage of requiring substantially greater bandwidth for a given amount of information than a corresponding analog signal.

The desirable noise immunity properties of binary digits (bits) is achieved by recognizing only one of the two possible signal states at any one time. This recognition requires information relating to the time interval during which a bit occurs. For example, attempting to identify a bit during the transition between signal levels might result in substantial error in the recognition of the data.

A technique which can be used to provide timing information is to transmit a continuous clock signal over a signal path separate from the signal path of the data. This requires two interconnection channels or two interconnection cables in the context of a wired communication system. In a fixed system for point-to-point communications this is a satisfactory solution, but may not be practical for network communication systems. In network systems, any one of a large number of stations interconnected by a common bus may transmit data to the remaining stations for a short interval. This is termed a burst communication. Network communication systems involve many stations and many signal paths, and are often modified and added to. The use of two cables (one data cable and one clock cable) instead of one complicates installation and modification of network communication systems. Furthermore, in order to have the clock signal arrive at a particular station with the proper phase relative to the data signal, each member of the pairs of interconnection cables must have the same length. While trimming a single cable to the proper length or providing a phase adjustment for a single receiver in a point-to-point communication system is not burdensome, the trimming and phase adjusting may be impractical in a large network system which is subject to alteration.

In order to avoid the need for a second cable for distributing the clock signal, encoding methods such as Manchester (Bi-Phase) have been used to encode the clock signal together with the data for transmission over a single channel. Each receiver includes circuits for identifying and extracting the clock signal from the data. A known method for extracting clock information from data signals is by the use of an oscillator controlled by a phase lock loop responsive to transitions of the data signal. The relatively long time constant of the phase lock loop provided by the loop filter prevents the oscillator from drifting off frequency during those times when the data includes no transitions, such as during a long string of logic high levels (hereinafter referred to simply as HIGH) and logic low levels (hereinafter LOWs). In network systems, however, each station may transmit for a short period of time, and the clocks of the various stations may not be at exactly the same phase, nor even at the same frequency. The relatively slow slew rate of a phase lock loop, which is advantageous in the context of a continuous data transmission in preventing drifting off of frequency, has the disadvantage in a burst communication mode of producing clock signals at the wrong frequency or phase for long time after the initiation of the communication. When the clock signal is not in the correct frequency and phase, undesirable data communication errors may result.

Another way of extracting a clock from a data stream is described in the context of a television teletex data signal in U.S. Pat. No. 4,222,117 issued Sept. 9, 1980, to Richard Bugg. This clock recovery circuit applies the data stream from a data slicer to an edge detector, and the edge signals are applied by way of a controlled switch to an inductance-capacitance (LC) tuned circuit to ring the tuned circuit and thereby create oscillations. The oscillations are applied by way of an amplitude limiter to clock the data decoder. In the Bugg arrangement a separate control of the amplitude of the oscillations is provided by operating the controlled switch to increase or decrease the excitation to prevent reduction in the quality (Q) of the tuned circuit due to overexcitation, and to prevent loss of clock signals due to self damping by the tuned circuit under adverse signal conditions.

It is anticipated that network data communication systems using fiber optic cables will in the future operate at data rates which are in the many hundred of megabits per second (Mbits/sec). At such data rates, the electrical signal produced by the photoelectric detector of each receiver must be routed by the use of transmission lines, properly terminated as required to prevent reflections. The Bugg arrangement may be difficult to implement at such data rates. At frequencies in the hundreds of Mbits/sec, an LC tuned circuit has a relatively low Q, and therefore tends to ring for a very short time. This tends to cause large variations in amplitude or to completely extinguish the clock signal during intervals in which the data stream has a low clock signal content. The low Q of the tuned circuit is exacerbated by the relatively low impedance of the switching transistor coupled across the LC tuned circuit.

A clock recovery arrangement for data rates of hundreds of Mbits/sec and greater is needed.

SUMMARY OF THE INVENTION

A clock recovery circuit for recovering clock signals from a stream of digital data includes an impulse generator coupled to receive the data for generating impulse signals representative of at least some of the transitions of the digital data. The impulse signals are applied to a resonant cavity by an input coupler which induces a resonant field in the cavity in response to the impulse signals. An output coupler is coupled to the cavity and responsive to the resonant field to produce a clock signal having an amplitude which varies in response to the information content of the data. An amplitude stabilizer is coupled to the output coupler arrangement for stabilizing the amplitude of the clock signal.

DESCRIPTION OF THE INVENTION

Figure 1:
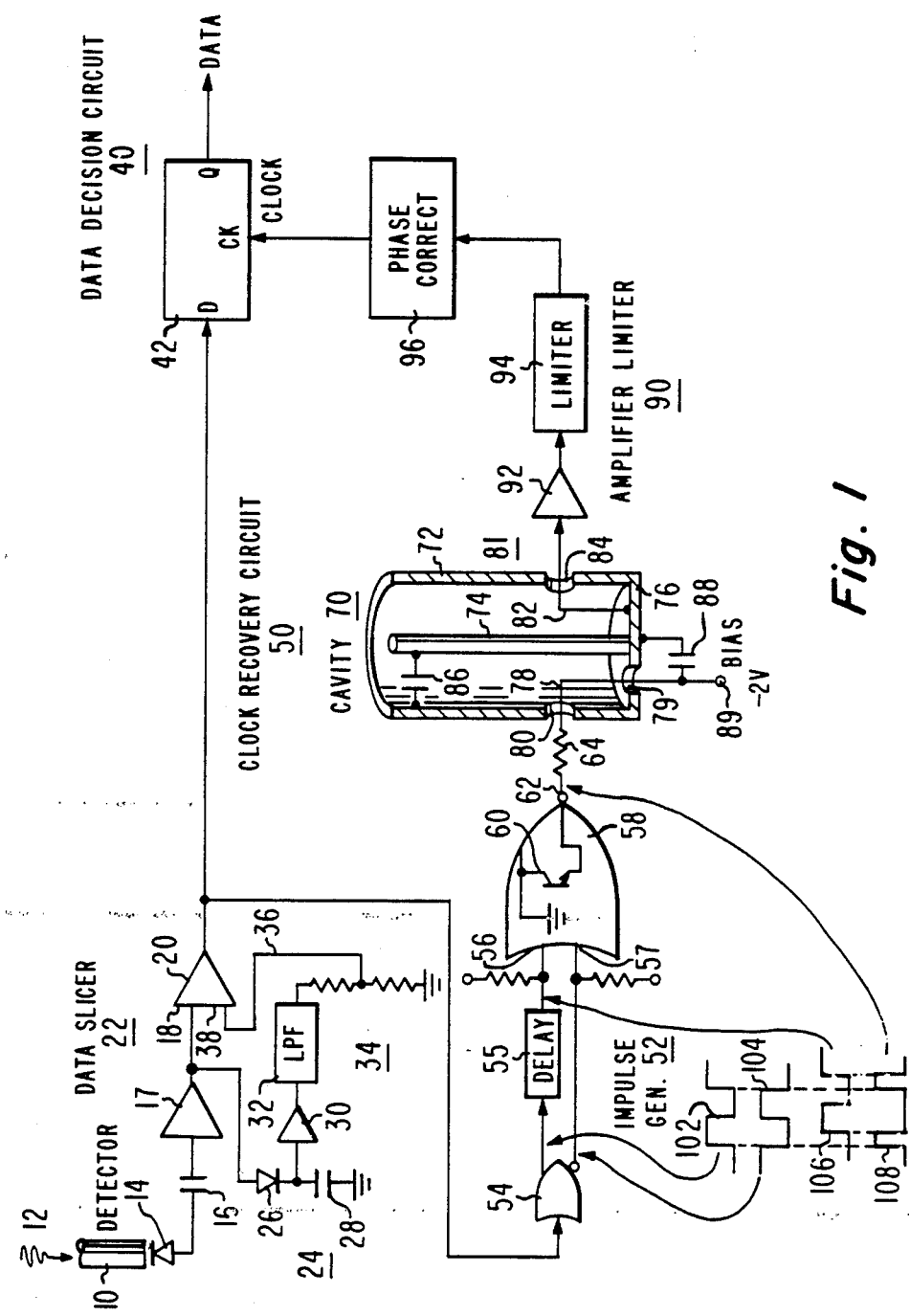
FIG. 1 is a diagram partially in schematic and partially in pictorial form of an optical data receiver according to the invention.

In FIG. 1, a fiber optic cable 10 couples a light signal modulated with digital signal illustrated as 12 to a photodetector 14 which converts the light signal into an amplitude modulated electrical signal. The electrical signal from detector 14 is AC coupled by a capacitor 16 and a preamplifier 17 to an input terminal 18 of a comparator 20 which is part of a data slicer designated generally as 22. Data slicer 22 includes a peak detector designated generally as 24 which includes a diode 26, a capacitor 28 and a buffer amplifier 30. Peak detector 24 produces a signal representative of the peak value of the signal at the output of preamplifier 17. The peak detected signal is applied from the output of buffer 30 by way of a low pass filter 32 to a voltage divider designated generally as 34 which divides the signal by two to produce on conductor 36 a voltage representative of half the peak signal value, which is applied to input terminal 38 of comparator 20 as a reference slicing level.

The output signal from data slicer 22 is applied to a data decision circuit designated generally as 40 which includes a D-type flip-flop 42 which receives the sliced data signal at its D input terminal and a phase corrected clock signal at its clock (CK) input terminal for sampling the data signal and holding it for the duration of a bit interval to produce the data signal. The output signal from data slicer 22 is also applied to a clock recovery circuit designated generally as 50. Clock recovery circuit 50 includes an impulse generator designated generally as 52. The data is applied to the input terminal of a paraphase amplifier or phase splitter 54 of impulse generator 52. Amplifier 54 is one-half of a type 11C01 ECL dual OR/NOR integrated circuit which produces on its noninverting output a signal arbitrarily illustrated as 102. The corresponding inverted output is illustrated as 104. Non-inverted output signal 102 is applied to a delay circuit 55 to produce a delayed non-inverted signal illustrated as 106 which is applied to an input terminal 56 of a NOR circuit 58 which is the other half of the 11C01 dual OR/NOR integrated circuit. Inverted signal 104 is applied without delay to an input terminal 57 of NOR 58. NOR 58 produces a positive output impulse signal only during those intervals in which the signals applied to its input terminals 56 and 57 are both low, as illustrated by waveform 108. Thus, impulse generator 52 produces an impulse output signal in response to positive going transitions of its input signal.

High speed ECL logic circuits such as 11C01 have the output terminal such as 62 internally coupled to the emitter of an output transistor, illustrated as 60, the collector of which is coupled to ground. Bias for transistor 60 must be applied externally to terminal 62.

The impulse signals 108 produced by impulse generator 52 are applied from output terminal 62 of NOR circuit 58 to a cavity designated generally as 70. As illustrated in FIG. 1, cavity 70 has been sectioned to illustrate the internal structure. Coaxial with a cylindrical outer conductor 72 of cavity 70 is an elongated center conductor 74. Center conductor 74 is physically supported at its lower end and short-circuited to outer conductor 74 by a conductive shorting plate illustrated as 76 which is orthogonal to the axis (not illustrated) of outer conductor 72 and center conductor 74. Impulse signals from output terminal 62 are applied by way of a resistor 64 to a magnetic coupling loop illustrated as a wire 78 passing through an aperture 80 in outer conductor 72. Magnetic coupling loop 78 is in effect a one turn primary winding of a transformer, which includes center conductor 74 as part of a one turn secondary winding. The impulse signals applied to input magnetic coupling loop 78 generate electromagnetic fields within cavity 70. The cavity is resonant at those frequencies for which the axial length of outer conductor 72 and center conductor 74 corresponds to one-quarter wavelength. The physical length of cavity 70 required for resonance may be reduced by a capacitor 86 coupled between the center and outer conductors at a location near the open circuited end of the cavity. Signals are coupled out of the cavity by an output coupling circuit designated generally as 81 which includes a second magnetic coupling loop illustrated as a wire 82 which is connected to shorting plate 76 and passes through a second aperture 84 in outer conductor 72. The oscillations coupled from cavity 70 by output coupling circuit 81 are applied to an amplifier/limiter designated generally as 90 including a preamplifier 92 and a limiter circuit 94. The amplified and limited oscillations are applied to a phase corrector 96 to correct for differences in the delay between the direct signal path between data slicer 22 and data decision circuit 40 and the path including clock recovery circuit 50.

Bias for transistor 60 of NOR gate 58 is supplied from a bias terminal 89. In order to apply the bias signal without affecting high frequency portions of the circuit, bias terminal 89 is connected through an aperture 79 in shorting plate 76 to the lower end of magnetic coupling loop 78. Thus, the direct bias current or voltage is applied through coupling loop 78 and resistor 64 to output terminal 62 of NOR 58 and to the emitter of transistor 60. The lower end of magnetic coupling loop 78 is effectively grounded to shorting plate 76 at the high frequencies of the impulses 108 by a capacitor 88.

Figure 2:
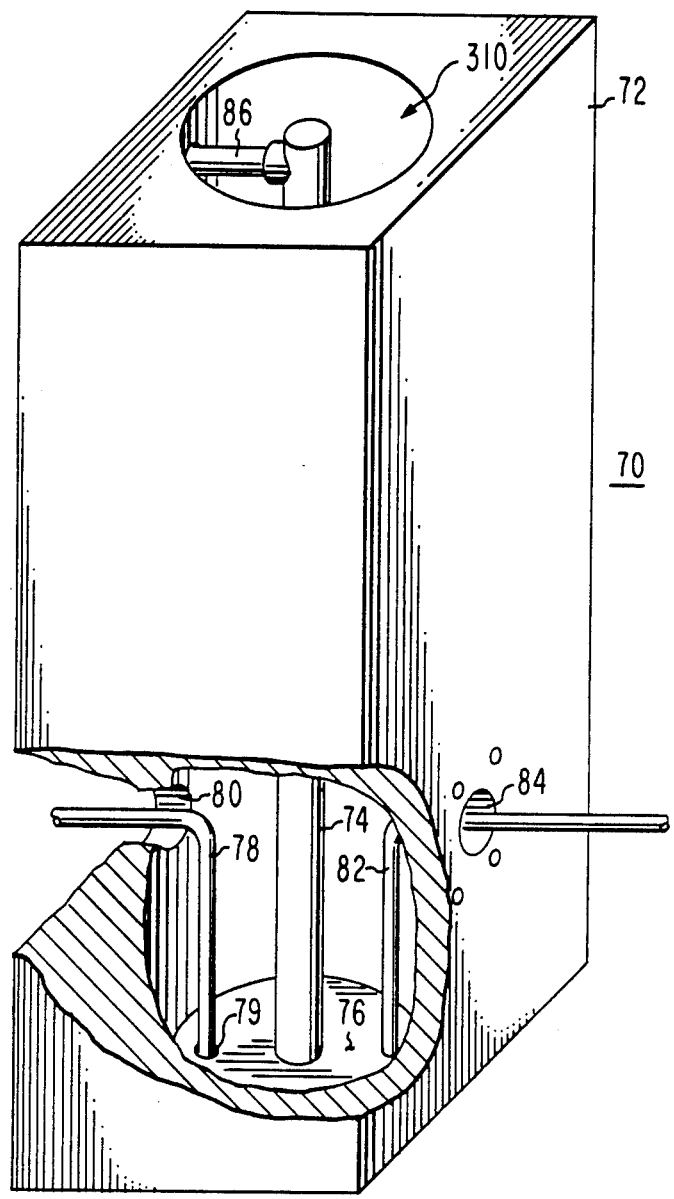
FIG. 2 is an isometric view, partially cut away, of a cavity suitable for use in the arrangement of FIG. 1.
Figure 3:
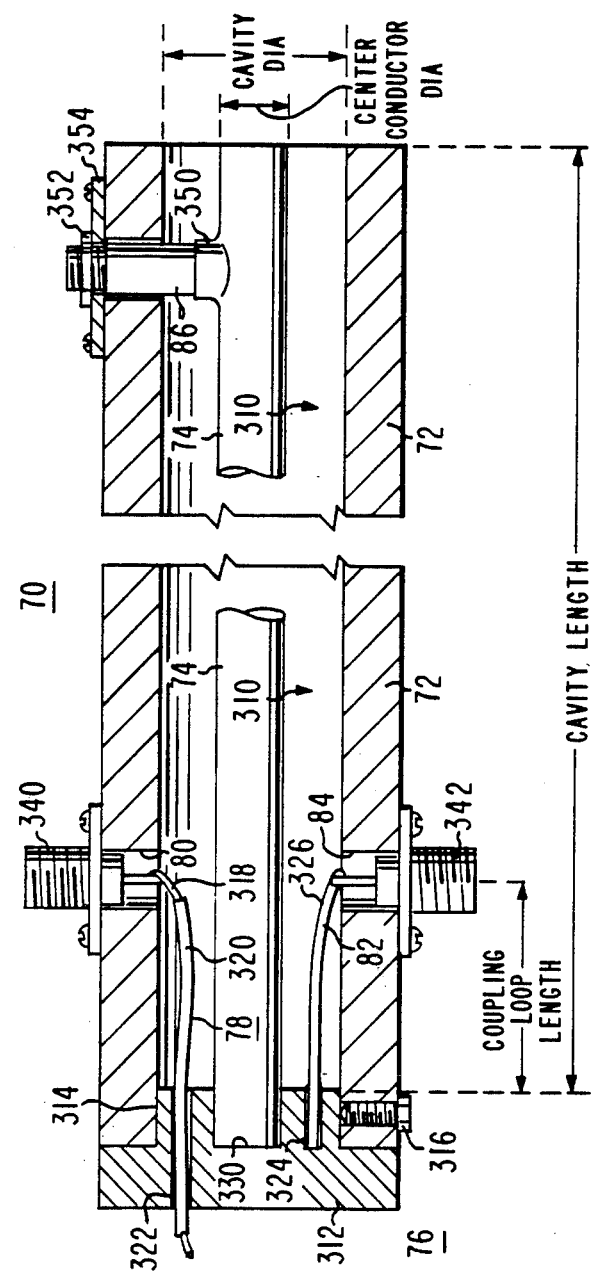
FIG. 3 is a cross-sectional view of the cavity of FIG. 2.

FIG. 2 illustrates cavity 70 in somewhat more detail then FIG. 1. FIG. 3 illustrates in greater detail a slightly different embodiment of cavity 70 which uses bulkhead connectors for providing oontact to the magnetic coupling loops, and has other slight modifications for ease of construction. In FIG. 3, it can be seen that outer conductor 72 is a block having a clylindrical bore 310. Shorting plate 76 includes a plate 312 having a portion 314 turned to fit within bore 310. A screw illustrated as 316 retains shorting plate 76. Input magnetic coupling loop 78 includes a wire 318 having insulation illustrated as 320, both of which pass through a hole 322 drilled through plate 76. Another hole 324 drilled part way through plate 76 receives the end of a bare wire 326 which is a part of output coupling loop 82. Wire 326 is soldered into hole 324. Center conductor 74 is received in and supported by a bore portion 330 of shorting plate 76. The ends of wires 318 and 326 remote from shorting plate 76 are mechanically fastened to and affixed by soldering to the center conductors of standard coaxial panel connectors 340 and 342. As illustrated in FIG. 3, capacitor 86 is a piston capacitor having an end 350 soldered to center conductor 74 and the opposite end threaded and affixed by a nut 352 to a plate 354 fastened to outer conductor 72.

For operation with Manchester (Biphase M) coded data having a data rate of approximately 200 Mbit/sec, cavity 70 must be resonant at approximately 400 Megahertz (MHz). A suitable cavity was found to have the following dimensions.

| Cavity length | 4" | 10 cm. |
| --- | --- | --- |
| Cavity diameter | 0.50" | 1.26 cm. |
| Center conductor diameter | 0.125" | 2.54 mm. |
| Coupling loop length | 1.5" | 3.8 cm. |

In addition, resistor 64 was selected to have a resistance of 120 ohms and the cavity output was optimized by adjusting 0.1 to 10 picofarad (Pf) capacitor 86 to about 4 Pf.

The input and output coupling loops can be adjusted by moving wires 318 and 326 closer or farther from center conductor 74 as required to increase coupling or reduce loading on the cavity. The use of coupling loops allows an effective impedance transformation between the relatively low impedance drive and output circuits and the very high impedance of the resonant cavity. (This maintains high Q and therefore allows ringing to occur for a long period of time, even in the absence of continuous excitation. It was found that with Manchester coding and a data rate of approximately 200 Mbits/sec that the output signal from the cavity varied in amplitude by a ratio of 2:1, an amount well within the capability of limiter 90.

Other embodiments of the invention will be apparent to those skilled in the art. For example, the cavity and associated parts may be plated with gold or silver, for improved conductivity. Cavity types other than coaxial may be used. Electric probes rather than magnetic coupling loops may be used to couple to and from the cavity.

What is claimed is:

1. A receiver adapted to be coupled to a fiber optic cable of a data transmission system for receiving light signals modulated with baseband digital data, comprising:
    a detector coupled to receive said light signals for generating electrical signals in response to said light signals;
    a data slicer coupled to said detector for comparing said electrical signals with a reference signal for generating data signals;
    impulse generating means coupled to said data slicer for generating impulse signals in response to transitions of said data signals;
    an electromagnetic cavity which comprises a cylindrical outer conductor having an axis, a center conductor mounted coaxially within said outer conductor, a short-circuiting means coupling said center and outer conductors together at a plane orthogonal to said axis;
    input coupling means coupled to said impulse generating means and coupled to said cavity for causing said cavity to respond to said impulse signals for generating resonant fields;
    output coupling means coupled to said cavity for generating amplitude varying clock signals, at a frequency related to the clock frequency of said digital data, in response to said resonant fields;
    amplitude limiting means coupled to said output coupling means for generating constant-amplitude clock signals in response to said amplitude varying clock signals; and
    logic means coupled to said data slicer and to said amplitude limiting means for regenerating said data.

2. A data transmission system which receives baseband data and clock signal in the form of pulses of light from a fiber optic cable, and which includes a clock recovery circuit for recovering a clock signal from a stream of digital data, comprising:
    transducing means coupled to said fiber optic cable for transducing said pulses of light into said stream of digital data;
    impulse generating means coupled to said transducing means for receiving said stream of digital data for generating impulse signals representative of at least some transitions in said digital data;
    a resonant cavity which comprises a cylindrical outer conductor having an axis, a center conductor mounted coaxially within said outer conductor, and short-circuit means coupling said inner and outer conductors together at a plane orthogonal to said axis;
    input coupling means coupled to said impulse generating means and to said cavity for inducing a resonant field in said cavity in response to said impulse signals;
    output coupling means coupled to said cavity and responsive to said resonant field for coupling to an output terminal a variable amplitude clock signal having an amplitude varying in response to the information content of said data and a frequency related to the frequency of said clock signal; and
    amplitude stabilizing means coupled to said output terminal of said output coupling means for stabilizing said variable amplitude clock signal to produce a stable clock signal.

3. A circuit according to claim 2 wherein said input and output coupling means each comprise impedance transforming means.

4. A circuit according to claim 3 wherein said impedance transforming means comprises a magnetic coupling loop.

5. A circuit according to claim 2 further comprising tuning capacitance means coupled to said outer conductor and to said center conductor at a location remote from said short-circuiting means.

6. A clock recovery circuit for recovering a clock signal from a stream of digital data, comprising: impulse generating means coupled to receive said stream of digital data and including a nonsaturated transistor including an emitter for generating impulse signals representative of at least some transitions in said digital data;
    a resonant cavity which comprises a cylindrical outer conductor having an axis, a center conductor mounted coaxially within said outer conductor, and short-circuiting means coupling said inner and outer conductors together at a plane orthogonal to said axis;
    input coupling means, coupled to said impulse generating means, which comprises a magnetic coupling loop coupled to said center conductor near said short-circuiting means for inducing a resonant field in said cavity in response to said impulse signal;
    output coupling means coupled to said cavity and responsive to said resonant field for coupling to an output terminal a variable amplitude clock signal having an amplitude varying in response to the information content of said data;
    amplitude stabilizing means coupled to said output terminal of said output coupling means for stabilizing said variable amplitude clock signal to produce a stable clock signal; and resistance means serially coupled with said emitter of said transistor and said magnetic coupling loop.

7. A circuit according to claim 6 further comprising capacitance means for providing an alternating current path through said magnetic coupling loop to said short-circuiting means; and direct current bias means coupled to said magnetic coupling loop for providing a source of bias to said emitter of said transistor by way of said resistance means.

8. A circuit according to claim 7 wherein said impulse generating means comprises:

paraphase means coupled to receive said stream of digital data for generating inphase and phase inverted data signals;

delay means coupled to said paraphase means for delaying one of said inphase and phase inverted data signals by a duration less than the duration of one bit of said digital data; and coincidence logic means coupled to said paraphase means for receiving one said inphase and phase inverted data signals and coupled to said delay means for receiving the other of said inphase and phase inverted data siqnals for generating said impulse signals.

9. A receiver for light signals modulated wiwth digital data, comprising:

a detector coupled to receive said light signals for generating electrical signals in response to said light signals;

a data slicer coupled to said detector for comparing said electrical signals with a reference signal for generating data signals;

impulse generating means including a nonsaturated transistor including an emitter, said transistor being coupled to said data slicer for generating impulse signals at said emitter in response to transitions of said data signals;

an electromagnetic cavity including a cylindrical outer conductor having an axis, a center conductor mounted coaxially within said outer conductor, and short-circuiting means coupling said center and outer conductors together at a plane orthogonal to said axis;

input coupling means comprising a magnetic coupling loop coupled to said center conductor near said short-circuiting means for causing said cavity to respond to said impulse signals for generating resonant fields;

output coupling means coupled to said cavity for generating amplitude varying clock signals in response to said resonant fields;

amplitude limiting means coupled to said output coupling means for generating constant-amplitude clock signals in response to said amplitude varying clock signals;

logic means coupled to said data slicer and to said amplitude limiting means for regenerating said data; and further comprising;

resistance means serially coupled with said emitter of said transistor and said magnetic coupling loop.

10. A receiver according to claim 9 further comprising capacitance means for providing an alternating current path through said magnetic coupling loop to said short-circuiting means; and direct current bias means coupled to said magnetic coupling loop for providing a source of bias to said emitter of said transistor by way of said resistance means.

11. A receiver according to claim 10 wherein said impulse generating means comprises:

paraphase means coupled to said data slicer for receiving said data signals for generating inphase and phase inverted data signals;

delay means coupled to said paraphase means for delaying one of said inphase and phase inverted data signals by a duration less than the duration of one bit of said digital data; and coincidence logic means coupled to said paraphase means for receiving one of said inphase and phase inverted data signals and coupled to said delay means for receiving the other of said inphase and phase inverted data signals for generating said impulse signals.

* * * * *